United States Patent [19]

Jonak

[11] Patent Number: 4,706,504
[45] Date of Patent: Nov. 17, 1987

[54] FLOW INDICATING DEVICE AND METHOD
[75] Inventor: Vladimir Jonak, Tumba, Sweden
[73] Assignee: Alfa-Laval Marine & Power Engineering AB, Tumba, Sweden
[21] Appl. No.: 881,025
[22] PCT Filed: Oct. 15, 1985
[86] PCT No.: PCT/SE85/00396
§ 371 Date: Jun. 18, 1986
§ 102(e) Date: Jun. 18, 1986
[87] PCT Pub. No.: WO86/02443
PCT Pub. Date: Apr. 24, 1986
[30] Foreign Application Priority Data
Oct. 19, 1984 [SE] Sweden ................. 8405226
[51] Int. Cl.$^4$ ............................. G01F 1/26
[52] U.S. Cl. ............................. 73/861.58
[58] Field of Search ........... 73/861.53, 861.54, 861.55, 73/861.58, 861.57, 861.71, 861.74; 340/610, 611

[56] References Cited
U.S. PATENT DOCUMENTS 2,459,689  1/1949  Dickey et al. .......... 73/861.54
2,647,402  4/1953  Ibbott .................. 73/861.58
2,952,753  9/1960  Kmiecik et al. ......... 73/861.74 X
3,805,611  4/1974  Hedland ................ 73/861.58
3,881,354  5/1975  Block .................. 73/861.71
4,254,664  3/1981  Graham ................. 73/861.58
4,552,027  11/1985 Larner ................. 73/861.53

Primary Examiner—Herbert Goldstein
Attorney, Agent, or Firm—Cyrus S. Hapgood

[57] ABSTRACT

A device for indicating changes of a fluid flow, comprises a housing (1) and a support member (7), connected with the housing. A valve member (11) is slidable on the support member (7) and is adapted to increase or decrease the through-flow area of a passage (14) provided in the housing for the fluid flow. A spring (13) supported by said support member (7) is urging the valve member to decrease the through-flow area of the passage. Indicating means (15, 16) is arranged to indicate the position of the valve member (11) in the housing. According to the invention, the support member (7) is adjustable relative to the housing in the moving direction of the valve member (11) for adapting the position of the valve member (7) to various magnitudes of fluid flow through the passage (14).

5 Claims, 1 Drawing Figure

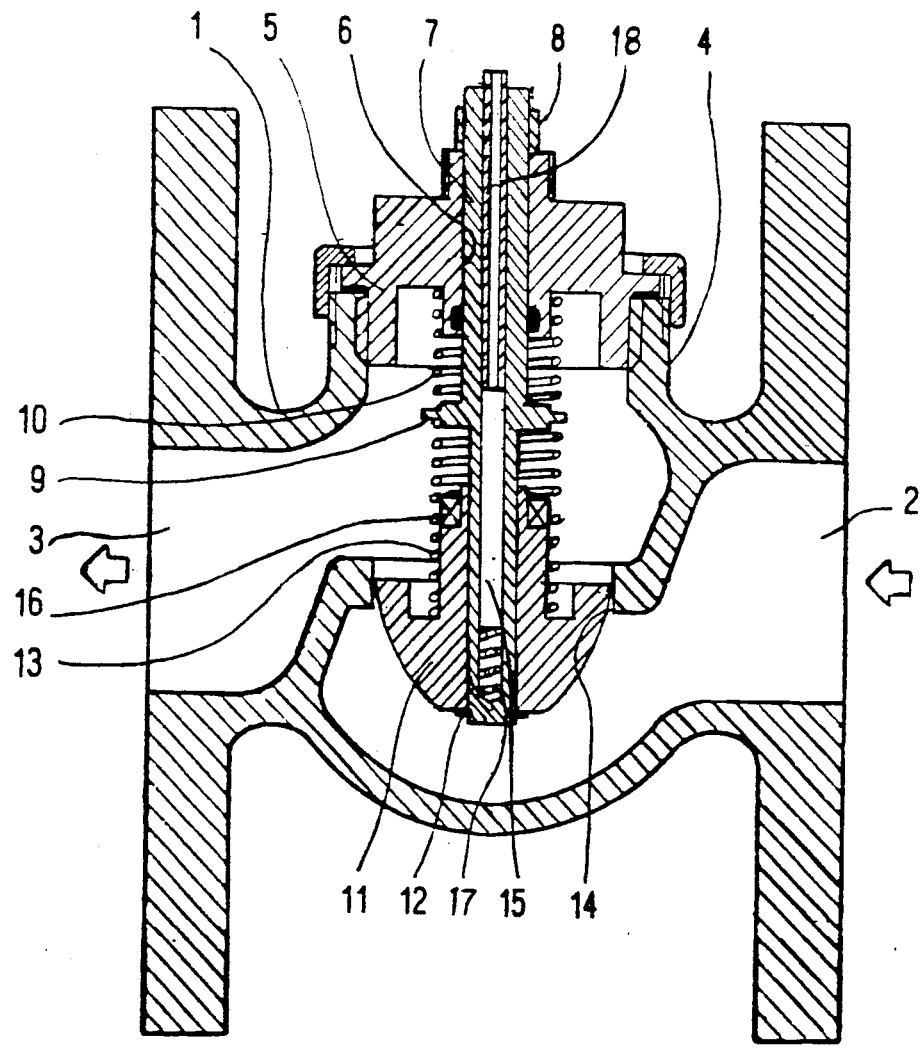

FLOW INDICATING DEVICE AND METHOD

The present invention relates to a device for indicating changes of a fluid flow, comprising a housing with an inlet and an outlet for the fluid, means in the housing forming a passage for the fluid on its way between said inlet and outlet, a valve member arranged in the housing and displaceable along a path relative to said means to successively increase or decrease the through-flow area of the passage, a support member connected with the housing, and a spring arranged between the valve member and the support member to actuate the valve member to decrease the through-flow area of the passage, the valve member being movable along said path by fluid flowing through the passage against the action of said spring. Said device also comprises indicating means arranged to indicate the position of the valve member in the housing. The invention also relates to a method of operating such a device.

A device of this kind is disclosed in U.S. Pat. No. 3,881,354. In this known device the valve member is adapted to compress a screw spring to a certain degree dependng on the rate of the flow through said passage. Changes of the flow rate in the passage will thus result in changes of the compression of the screw spring. By this device it is not possible to achieve the same high accuracy in indication of a small change of the flow rate at a large flow as at a small flow through the passage. The reason for this is the varying resistance to compression exerted by the screw spring at various stages of compression. It would thus be necessary to use different screw springs for various magnitudes of the fluid flow.

An object of the present invention is to provide a flow indicating device of the kind initially described, which is easily adjustable such that the same high accuracy can be obtained of an indication of a moderate change of the flow independent of the magnitude of the flow.

According to the invention this object is achieved by means of a device which is characterized in that the support member is adjustable relative to the housing in the moving direction of the valve member for adaptation of the position of the valve member to various magnitudes of flow through said passage.

In a preferred embodiment of the invention the valve member is guided by the support member along said path. Preferably the support member is displaceable relative to the housing in a direction away from the valve member against the action of a further spring provided between the support member and the housing, said further spring being stronger than the spring arranged between the valve member and the support member.

BRIEF DESCRIPTION OF THE DRAWING

The invention will be described more closely in the following with reference to the accompanying drawing, which shows, as an example, a partial length section of a device according to the invention.

In the drawing there is shown a housing 1 with an inlet 2 and an outlet 3 for a stream of liquid. The housing is provided with a socket 4, in which a closure member 5 is fitted. In the closure member 5 there is a bore 6, in which a support member in the form of a spindle 7 is axially slidable. The spindle is threaded and provided with a nut 8 at its end situated outside the housing. A disc shaped projection 9 is provided on a spindle portion situated within the housing. Between the projection 9 and the closure member 5 there is a screw spring 10 fitted on the spindle. By means of the nut 8 and this spring the position of the spindle can be adjusted axially relative to the housing 1. A valve member 11 provided with a central bore is slidable on the spindle portion between the projection 9 and the spindle end situated within the housing 1. Movement of said valve member in a direction away from the projection 9 is limited by a shoulder 12 at the end of the spindle 7. The valve member 11 is being pressed against the shoulder 12 by a screw spring 13, supported by the projection 9. Coaxially with the valve member 11 there is arranged a passage 14 in the housing for the flow between the inlet 2 and the outlet 3. The valve member 11 preferably has a parabolically curved surface for co-operation with the means forming said passage 14 to change the through-flow area of the latter.

The spindle 7 is provided with a bore axially extending from the spindle end situated outside the housing 1 to an end wall near the other end of the spindle 7. In the spindle bore there is provided an electric spring switch 15, a so-called reed switch. This co-operates with a magnet 16 fixed to the valve member 11. The reed switch 15 is positioned within the spindle bore by means of a screw spring 17 and a tube 18 threaded into the spindle bore. The screw spring 17 is situated between the bottom wall of the spindle bore and the reed switch 15 pressing the reed switch against one end of the tube 18. The reed switch 15 is to be actuated by the magnet 16 when the valve member has moved a certain distance from its position at rest on the sholder 12, i.e. at a point somewhere between the shoulder 12 and the projection 9. The location of said point is set by turning of the threaded tube 18 such that the reed switch 15 is moved axially in the spindle bore. Preferably, the location of said point is set such that the magnet 16 will acutate the reed switch 15 already when the valve member 11 has moved rather a small distance from the shoulder 12. This setting must be performed before the closure member 5, together with the support member 7 and the valve member 11, is fitted into the socket 4. The reed switch 15 and the magnet 16 thus constitute an indicating means arranged to indicate the position of the valve member 11 in the housing 1.

In use, i.e. while liquid is flowing through the housing 1, the device is further adjusted as follows: The support member or spindle 7 is moved by means of the nut 8 into a position relative to the housing 1 such that the liquid flowing through the passage 14 forces the valve member 11 to take a position relative to the spindle, at which the magnet 16 actuates the reed switch 15. At a certain decrease of the flow through the passage 14 the spring 13 will displace the valve member 11 relative to the spindle 7 such that the magnet 16 will no longer actuate the reed switch 15 to indicate the flow. A certain increase of the flow through the passage 14 would cause a corresponding cease of actuation as a result of an oppositely directed movement of the valve member 11 relative to the spindle 7.

If the liquid flow through the passage 14 ceases, the valve member 11 will of course become seated on the shoulder 12. In this position there will still be left a smaller or larger through-flow area of the passage 14 depending on the magnitude of the liquid flow for which the device was once adjusted.

The spring 13 is so much weaker than the spring 10 that it will be completely compressed by the force of the flowing liquid acting on the valve member 11, before compression of the spring 10 begins. The arrangement of the spring 10 is a precaution for a situation in which the flow indicating device would not have been adjusted in connection with a change to a substantially larger liquid flow. In such a case, the spring 10 will be compressed such that said larger flow will not be obstructed by the valve member. Otherwise, an undesired high pressure could arise, which could be damaging for equipment connected to the flow indicating device.

I claim:

1. A method of changing the measuring range of a device for indicating changes of a fluid flow, the indicating device comprising a housing (1) with an inlet (2) and an outlet (3) for the fluid, means in the housing (1) forming a passage (14) for said fluid on its way between said inlet (2) and outlet (3), a valve member (11) arranged in the housing (1) and displaceable along a path relative to said passage forming means to successively increase or decrease the through-flow area of the passage (14), a support member (7) connected with the housing (1), and a spring (13), which is supported by the support member (7) and arranged between the latter and the valve member (11) to actuate the valve member (11) to decrease the through-flow area of the passage (14), the valve member (11) being arranged to be moved along said path by the fluid flowing through the passage (14) against the action of said spring (13), said indicating device further comprising indicating means (15, 16) arranged to indicate a certain position of the valve member (11) relative to the support member (7), part (15) of said indicating means being connected with the support member (7), the method comprising moving the support member (7) relative to the housing (1) in one of the opening and closing directions of the valve member (11) from a first position, in which the valve member is adapted for a first fluid flow through the indicating device, to a second position in which the valve member is adapted for a different fluid flow through the indicating device.

2. A method according to claim 1, in which the support member (7) is moved relative to the housing (1) in one of the opening and closing directions of the valve member (11) while fluid is flowing through said passage (14) until said second position of the valve member relative to the support member is obtained.

3. In a device for indicating changes of a fluid flow and comprising a housing (1) with an inlet (2) and an outlet (3) for the fluid, means in the housing (1) forming a passage 14 for said fluid on its way between said inlet (2) and outlet (3), a valve member (11) arranged in the housing (1) and displaceable along a path relative to said passage forming means to successively increase or decrease the through-flow area of the passage (14), a support member (7) connected with the housing (1), and a spring (13), which is supported by the support member (7) and arranged between the latter and the valve member (11) to actuate the valve member (11) to decrease the through-flow area of the passage (14), the valve member (11) being arranged to be moved along said path by the fluid flowing through the passage (14) against the action of said spring (13), said indicating device further comprising indicating means (15, 16) arranged to indicate a certain position of the valve member (11) relative to the support member (7), part (15) of said indicating means being connected wih the support member (7), the improvement comprising means (8, 10) separate from said housing (1) and said support member (7) for maintaining the support member in various operative positions relative to the housing aligned with the direction of opening and closing of said valve member (11).

4. A device according to claim 3, characterized in that said separate means include a nut (8) and a further spring (10), said nut (8) being threaded on an end of the support member (7) situated outside the housing (1), and said further spring (10) being provided between the support member (7) and the housing (1), so that the support member (7) is displaceable relative to the housing (1) in a direction away from the valve member (11) against the action of said further spring (10).

5. The device according to claim 3, characterized in that said separate means (8, 10) include an element (8) operable from outside the housing (1).

* * * * *